United States Patent
Kitamura (10) Patent No.: US 11,496,077 B2
(45) Date of Patent: Nov. 8, 2022

(54) DRIVE CONTROLLER, DRIVE UNIT, AND POWER STEERING

(71) Applicant: NIDEC CORPORATION, Kyoto (JP)

(72) Inventor: Takashi Kitamura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/266,108

(22) PCT Filed: Jun. 25, 2019

(86) PCT No.: PCT/JP2019/025031
§ 371 (c)(1),
(2) Date: Feb. 5, 2021

(87) PCT Pub. No.: WO2020/031526
PCT Pub. Date: Feb. 13, 2020

(65) Prior Publication Data
US 2021/0229735 A1     Jul. 29, 2021

(30) Foreign Application Priority Data

Aug. 7, 2018   (JP) ............................. JP2018-148932

(51) Int. Cl.
*H02P 6/10*   (2006.01)
*B62D 5/04*   (2006.01)
(Continued)

(52) U.S. Cl.
CPC ................ *H02P 6/10* (2013.01); *B62D 5/046* (2013.01); *B62D 5/0481* (2013.01);
(Continued)

(58) Field of Classification Search
None
See application file for complete search history.

(56) References Cited

U.S. PATENT DOCUMENTS 5,920,161 A * 7/1999 Obara ................... B60L 15/025
                                                180/65.265
6,359,415 B1 * 3/2002 Suzuki ..................... H02P 25/03
                                                   318/700
(Continued)

FOREIGN PATENT DOCUMENTS

CN    104836500 A  *  8/2015  .............. H02P 21/05
CN    110165952 A  *  8/2019  .......... H02P 21/0003
(Continued)

OTHER PUBLICATIONS

International Search Report in PCT/JP2019/025031, dated Sep. 10, 2019. 4pp.

*Primary Examiner* — Kevin R Steckbauer
(74) *Attorney, Agent, or Firm* — Hauptman Ham, LLP (57) ABSTRACT

An aspect of a drive controller controls drive of a three-phase motor, and includes an imbalance calculation unit that calculates an electrical imbalance between phases in the three-phase motor, a control value calculation unit that calculates current control values in respective axial directions of a rotating coordinate system of the three-phase motor according to a given target, and a balance compensation unit that reduces the imbalance by adding a compensation value to a current control value in an axial direction other than a q-axis of the current control values calculated by the control value calculation unit.

11 Claims, 6 Drawing Sheets

(51) Int. Cl.
*H02P 21/05* (2006.01)
*H02P 21/22* (2016.01)

(52) U.S. Cl.
CPC ............ *B62D 5/0487* (2013.01); *H02P 21/05* (2013.01); *H02P 21/22* (2016.02); *B62D 5/0484* (2013.01)

(56) References Cited

U.S. PATENT DOCUMENTS

| | | | | |
|---|---|---|---|---|
| 6,700,400 | B2 * | 3/2004 | Atarashi | B60L 50/51 701/66 |
| 6,927,548 | B2 * | 8/2005 | Nishizaki | H02P 21/06 318/434 |
| 7,605,551 | B2 * | 10/2009 | Atarashi | H02K 21/029 318/700 |
| 7,843,154 | B2 * | 11/2010 | Suzuki | H02P 21/06 318/400.15 |
| 8,150,580 | B2 * | 4/2012 | Suzuki | H02P 21/0003 701/41 |
| 8,704,469 | B2 * | 4/2014 | Tadano | H02P 21/05 318/431 |
| 9,083,271 | B2 * | 7/2015 | Kim | H02P 21/05 |
| 9,136,785 | B2 * | 9/2015 | Gebregergis | H02P 21/05 |
| 9,143,081 | B2 * | 9/2015 | Gebregergis | H02P 21/05 |
| 9,774,286 | B2 * | 9/2017 | Hozuki | H02P 21/14 |
| 9,787,230 | B2 * | 10/2017 | Nakajima | H02P 6/28 |
| 9,979,340 | B2 * | 5/2018 | Suzuki | H02P 6/10 |
| 10,494,017 | B2 * | 12/2019 | Takase | H02P 6/10 |
| 10,530,245 | B2 * | 1/2020 | Minaki | H02P 6/10 |
| 10,574,163 | B2 * | 2/2020 | Hamada | H02P 21/14 |
| 10,608,572 | B2 * | 3/2020 | Ue | H02M 7/53871 |
| 10,668,941 | B2 * | 6/2020 | Takase | B62D 6/00 |
| 10,676,127 | B2 * | 6/2020 | Takase | H02P 21/13 |
| 10,807,635 | B2 * | 10/2020 | Takase | H02P 21/05 |
| 10,862,415 | B2 * | 12/2020 | Watahiki | B62D 5/046 |
| 10,873,284 | B2 * | 12/2020 | Takase | H02M 7/53873 |
| 11,097,772 | B2 * | 8/2021 | Takase | H02P 21/0003 |
| 11,251,731 | B2 * | 2/2022 | Endo | H02P 27/12 |
| 11,264,924 | B2 * | 3/2022 | Shimizu | H02P 5/74 |
| 2002/0113615 | A1 * | 8/2002 | Atarashi | H02P 29/662 318/400.01 |
| 2004/0206571 | A1 * | 10/2004 | Nishizaki | B62D 5/0472 180/446 |
| 2008/0019855 | A1 * | 1/2008 | Atarashi | H02K 21/029 418/7 |
| 2008/0167779 | A1 * | 7/2008 | Suzuki | B62D 5/046 180/443 |
| 2008/0203958 | A1 * | 8/2008 | Suzuki | H02P 21/06 318/632 |
| 2012/0306411 | A1 * | 12/2012 | Tadano | H02P 21/13 318/400.02 |
| 2014/0265961 | A1 * | 9/2014 | Gebregergis | H02P 21/05 318/400.23 |
| 2014/0265962 | A1 * | 9/2014 | Gebregergis | H02P 21/05 318/400.23 |
| 2015/0333670 | A1 * | 11/2015 | Nakajima | H02P 6/10 318/400.2 |
| 2016/0111991 | A1 * | 4/2016 | Hozuki | H02P 6/10 318/400.02 |
| 2017/0302206 | A1 * | 10/2017 | Hamada | H02M 7/4833 |
| 2017/0373627 | A1 * | 12/2017 | Suzuki | H02P 27/04 |
| 2019/0131910 | A1 * | 5/2019 | Ue | H02M 1/38 |
| 2019/0241208 | A1 * | 8/2019 | Takase | H02P 21/05 |
| 2019/0252972 | A1 * | 8/2019 | Minaki | H02P 21/22 |
| 2019/0256128 | A1 * | 8/2019 | Takase | H02P 21/06 |
| 2019/0322309 | A1 * | 10/2019 | Takase | H02M 7/48 |
| 2019/0375449 | A1 * | 12/2019 | Takase | B62D 5/046 |
| 2020/0059182 | A1 * | 2/2020 | Watahiki | B62D 5/0463 |
| 2020/0130730 | A1 * | 4/2020 | Takase | H02P 21/0003 |
| 2020/0180682 | A1 * | 6/2020 | Takase | H02M 1/0025 |
| 2020/0377144 | A1 * | 12/2020 | Endo | B62D 5/0403 |
| 2020/0395877 | A1 * | 12/2020 | Endo | H02P 29/50 |
| 2020/0406958 | A1 * | 12/2020 | Endo | H02P 6/10 |
| 2021/0044223 | A1 * | 2/2021 | Shimizu | H02P 21/36 |
| 2021/0044234 | A1 * | 2/2021 | Endo | B62D 5/046 |
| 2021/0179165 | A1 * | 6/2021 | Endo | H02P 6/10 |
| 2021/0203256 | A1 * | 7/2021 | Toyodome | F25B 31/026 |
| 2021/0229735 | A1 * | 7/2021 | Kitamura | B62D 5/0481 |
| 2021/0305921 | A1 * | 9/2021 | Hatakeyama | H02M 7/5395 |

FOREIGN PATENT DOCUMENTS

| | | | | |
|---|---|---|---|---|
| CN | 110635732 | A * | 12/2019 | ............ H02P 21/05 |
| CN | 110855203 | A * | 2/2020 | ........... B62D 5/0409 |
| CN | 110165952 | B * | 1/2021 | .......... H02P 21/0003 |
| CN | 112398400 | A * | 2/2021 | ............ H02P 21/05 |
| DE | 102019122218 | A1 * | 2/2020 | ........... B62D 5/0409 |
| JP | 200432917 | A | 1/2004 | |
| JP | 2004032917 | A * | 1/2004 | ............ H02P 21/05 |
| JP | 201166947 | A | 3/2011 | |
| JP | 2011066947 | A * | 3/2011 | ............ H02P 21/05 |
| JP | 201385423 | A | 5/2013 | |
| JP | 2019013135 | A * | 1/2019 | ............ B62D 5/046 |
| JP | 2020031456 | A * | 2/2020 | ........... B62D 5/0409 |
| WO | WO-2014119492 | A1 * | 8/2014 | ............ H02P 21/05 |
| WO | 2017009907 | A1 | 1/2017 | |
| WO | WO-2017009907 | A1 * | 1/2017 | ............ H02P 23/26 |

* cited by examiner

DRIVE CONTROLLER, DRIVE UNIT, AND POWER STEERING

CROSS-REFERENCE TO RELATED APPLICATIONS

This is the U.S. national stage of application No. PCT/JP2019/025031, filed on Jun. 25, 2019, and priority under 35 U.S.C. § 119(a) and 35 U.S.C. § 365(b) is claimed from Japanese Patent Application No. 2018-148932, filed on Aug. 7, 2018.

FIELD OF THE INVENTION

The present invention relates to a drive controller, a drive unit, and a power steering.

BACKGROUND

Examples of a conventionally known drive controller for a three-phase motor include a drive controller that uses a current value in each of axial directions, such as dq axes and dqz axes, of a rotating coordinate system of the motor as a control value.

For example, there is a motor controller that controls a current to be supplied to a motor based on a q-axis current command value Iq, a d-axis current command value Id, a q-axis current detection value Iq, a d-axis current detection value Id, and an estimated rotor angle θ.

When the motor rotates at a low speed, power loss of each phase may differ to cause an imbalance state. Such an imbalance state causes a temperature rise in a specific part of a drive circuit, or causes an imbalance of resistance in a coil wire. Then, the imbalance of resistance may cause torque ripple.

SUMMARY

A drive controller according to an aspect of the present invention controls drive of a three-phase motor, and includes an imbalance calculation unit that calculates an electrical imbalance between phases in the three-phase motor, a control value calculation unit that calculates current control values in respective axial directions of a rotating coordinate system of the three-phase motor according to a given target, and a balance compensation unit that reduces the imbalance by adding a compensation value to a current control value in an axial direction other than a q-axis of the current control values calculated by the control value calculation unit. A drive unit according to an aspect of the present invention includes the drive controller, and a three-phase motor that is driven under control of the drive controller.

A power steering according to an aspect of the present invention includes the drive controller, a three-phase motor that is driven under control of the drive controller, and a power steering mechanism that is driven by the three-phase motor.

The above and other elements, features, steps, characteristics and advantages of the present disclosure will become more apparent from the following detailed description of the preferred embodiments with reference to the attached drawings.

DETAILED DESCRIPTION

Hereinafter, embodiments of a drive controller, a drive unit, and a power steering of the present disclosure will be described in detail with reference to the accompanying drawings. However, to avoid unnecessarily redundant description below and facilitate understanding by those skilled in the art, unnecessarily detailed description may be eliminated. For example, detailed description of already well-known matters and duplicated description of a substantially identical configuration may be eliminated.

Figure 1:
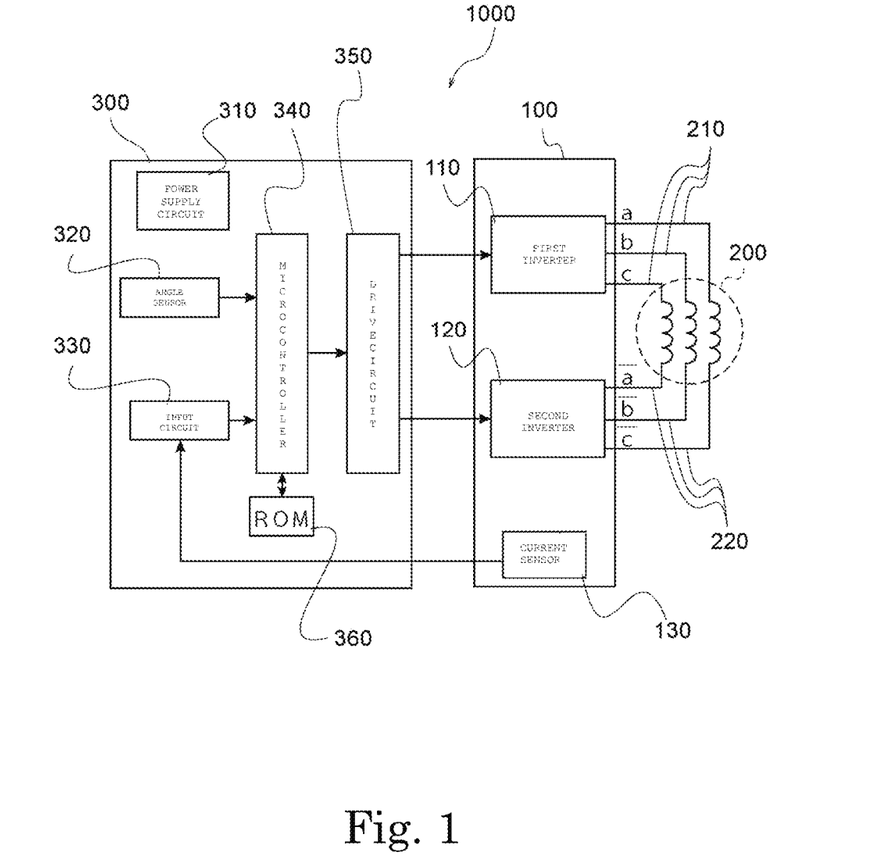
FIG. 1 is a diagram schematically illustrating a block configuration of a motor drive unit according to the present embodiment.

FIG. 1 is a diagram schematically illustrating a block configuration of a motor drive unit 1000 according to the present embodiment. The motor drive unit 1000 includes an electric power supply device 100, a motor 200, and a control circuit 300.

In the present specification, the motor drive unit 1000 including the motor 200 as a component will be described. The motor drive unit 1000 including the motor 200 corresponds to an example of the drive unit of the present invention. However, the motor drive unit 1000 may be a device for driving the motor 200, excluding the motor 200 as a component. The motor drive unit 1000 excluding the motor 200 corresponds to an example of the drive controller of the present invention.

The motor 200 is, for example, a three-phase AC motor. The motor 200 has a-phase, b-phase, and c-phase coils. The coils are wound by a winding method of, for example, concentrated winding or distributed winding.

The motor drive unit 1000 can convert electric power from an external power source into electric power to be supplied to the motor 200 by the electric power supply device 100. For example, a first inverter 110 and a second inverter 120 can convert DC power into three-phase AC power that is a pseudo sine wave of each of an a-phase, a b-phase, and a c-phase.

The electric power supply device 100 includes the first inverter 110, the second inverter 120, and a current sensor 130. The first inverter 110 is connected to one end 210 of each of the coils of the motor 200, and the second inverter 120 is connected to the other end 220 of each of the coils of the motor 200. In the present specification, "connection" between parts (components) mainly means an electrical connection. The motor 200 is a so-called unconnected motor in which the coils of respective phases are not connected to each other. In the present embodiment, as an example, an SPM motor including a rotor provided on its surface with a magnet is used as the motor 200.

The first inverter 110 and the second inverter 120 each include switching elements connected to the respective coils of the motor 200, and electric power is converted and supplied to the motor 200 by switching operation of the switching elements.

The current sensor 130 includes, for example, a shunt resistor and a current detection circuit, and detects a current flowing through the first inverter 110 and the second inverter 120 to detect a current value flowing through the coils of respective phases of the motor 200.

The control circuit 300 includes, for example, a power supply circuit 310, an angle sensor 320, an input circuit 330, a microcontroller 340, a drive circuit 350, and a ROM 360. The control circuit 300 causes the motor 200 to be driven by controlling overall operation of the power converter 100. Specifically, the control circuit 300 can perform closed loop control by controlling target motor torque and rotation speed.

The power supply circuit 310 generates DC voltage (e.g., 3V, 5V) required for each block in the control circuit 300. The angle sensor 320 is, for example, a resolver, or a Hall IC, or is also fabricated by a combination of an MR sensor having a magnetoresistive (MR) element and a sensor magnet. The angle sensor 320 detects a rotation angle of a rotor of the motor 200, and outputs a rotation signal indicating the detected rotation angle to the microcontroller 340. Depending on a motor control method (e.g., sensorless control), the angle sensor 320 may be eliminated.

The input circuit 330 receives the current value detected by the current sensor 130 (hereinafter referred to as an "actual current value"), and converts a level of the actual current value to an input level of the microcontroller 340 as necessary and outputs the actual current value to the microcontroller 340. The input circuit 330 is an analog-to-digital conversion circuit.

The microcontroller 340 receives the rotation signal of the rotor detected by the angle sensor 320, and also receives the actual current value output from the input circuit 330. The microcontroller 340 sets a target current value according to the actual current value and the rotation signal of the rotor and generates a PWM signal, and then outputs the generated PWM signal to the drive circuit 350. For example, the microcontroller 340 generates a PWM signal for controlling the switching operation (turn-on or turn-off) of each of the switch elements in the first inverter 110 and the second inverter 120 of the electric power supply device 100.

The drive circuit 350 is typically a gate driver. The drive circuit 350 generates a control signal (e.g., a gate control signal) to control the switching operation of each of the switch elements in the first and second inverters 110 and 120 in response to the PWM signal, and gives the generated control signal to each of the switch elements. The microcontroller 340 may have a function of the drive circuit 350. In that case, the control circuit 300 may be provided without the drive circuit 350.

The ROM 360 is, for example, a writable memory (e.g., PROM), a rewritable memory (e.g., a flash memory), or a read-only memory. The ROM 360 stores a control program including an instruction group for causing the microcontroller 340 to control the electric power supply device 100 (mainly the inverters 110 and 120).

A specific example of basic control of the inverters 110 and 120 using the control circuit 300 will be described.

As the basic control, the control circuit 300 sets a current balanced for each of phases of the motor 200 as a target value, and generates a PWM signal balanced for each of the phases according to the balanced target value. Switching operation according to such a balanced PWM signal causes the inverters 110 and 120 to apply balanced voltage to each of the phases of the motor 200.

Figure 2:
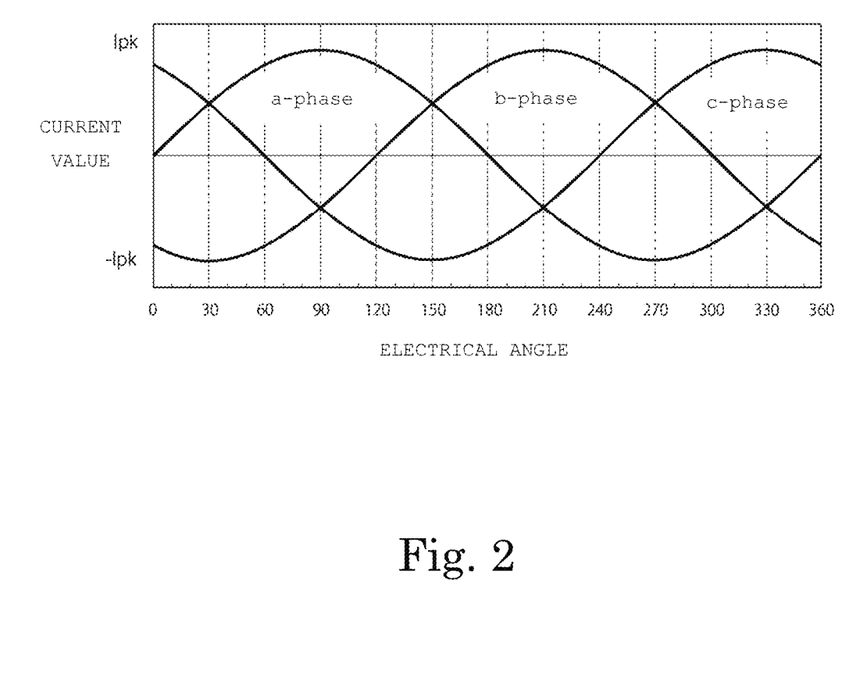
FIG. 2 is a diagram illustrating a current value flowing through each coil of corresponding one of phases of a motor under basic drive control.

Description, "three phases are balanced", here does not mean that voltage or a current identical in phase is applied to the three phases, but means that voltage or a current identical in amplitude and different in phase by 120°, for example, is applied thereto. In the present embodiment, as an example, the control circuit 300 applies a sinusoidal current to each of the phases under so-called three-phase energization control. FIG. 2 is a diagram illustrating a current value flowing through each coil of the corresponding one of phases of the motor 200 under basic drive control.

FIG. 2 exemplifies a current waveform (sine wave) acquired by plotting current values flowing through each of the a-phase, b-phase, and c-phase coils of the motor 200 when the first inverter 110 and the second inverter 120 are controlled according to the three-phase energization control under the basic drive control. FIG. 2 has a horizontal axis representing a motor electrical angle (deg), and a vertical axis representing a current value (A). Each of the phases has a maximum current value (peak current value) indicated as $I_{pk}$. Besides the sine wave exemplified in FIG. 2, the electric power supply device 100 can also drive the motor 200 using, for example, a rectangular wave.

Even when the motor 200 is driven under basic drive control as described above, the motor 200 rotating at a low speed may cause power loss in each phase to differ, causing an imbalance state. Such an imbalance state also causes torque ripple, so that correction control for suppressing an imbalance is also performed in the present embodiment.

Figure 3:
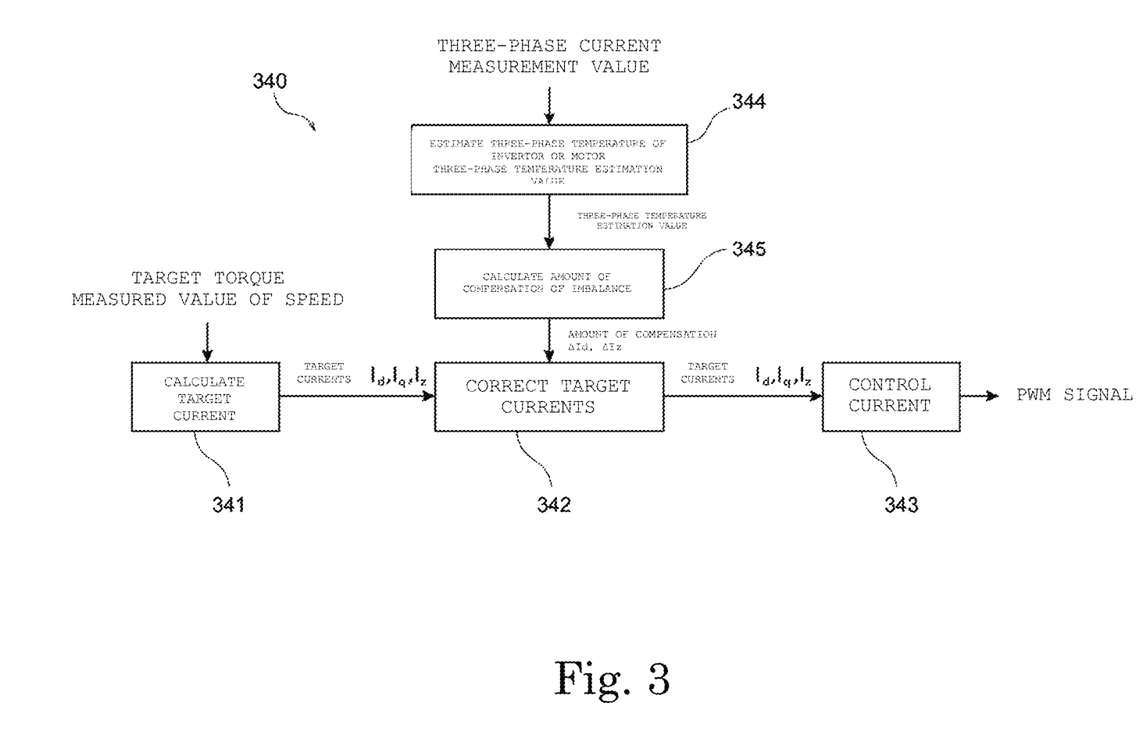
FIG. 3 is a functional block diagram illustrating functions of a microcontroller illustrated in FIG. 1.

FIG. 3 is a functional block diagram illustrating functions of the microcontroller 340 illustrated in FIG. 1.

The microcontroller 340 includes a target-current calculation unit 341, a target-current correction unit 342, a current control unit 343, a temperature estimation unit 344, and an imbalance-compensation-amount calculation unit 345, as internal functions.

The target-current calculation unit 341 receives target torque to be generated by the motor 200. This target torque is applied as a target from the outside of the motor drive unit 1000. When the motor drive unit 1000 constitutes, for example, a part of a power steering, the target-current calculation unit 341 may receive a measured value of vehicle speed.

Based on such a received value, the target-current calculation unit 341 generates a current value at which the target torque is obtained by the motor 200 as a target current value. At this time, as the target current value, target current values Id, Iq, and Iz in respective dqz axes of a rotating coordinate system of the motor 200 are generated. In other words, the target-current calculation unit 341 calculates a current control value in each axial direction of the rotating coordinate system of the motor 200 according to the applied target. A current in the z-axis direction generally does not contribute to torque generation of the motor 200, so that the target-current calculation unit 341 typically calculates a target current Iz of 0 in the z-axis direction. When the motor 200 is an SPM motor, reluctance torque is 0, and a current in the d-axis direction does not contribute to the torque generation of the motor 200. Thus, the target-current calculation unit 341 calculates a target current Id of 0 in the d-axis direction.

The target-current correction unit 342 corrects the target current values Id, Iq, and Iz in response to input of the amount of compensation of imbalance described later, and outputs the corrected target current values Id, Iq, and Iz to the current control unit 343.

The current control unit 343 respectively converts the received target current values Id, Iq, and Iz into current values Ia, Ib, and Ic to be applied to the a-phase, the b-phase, and the c-phase of the motor 200, and generates a PWM signal that allows the inverters 110 and 120 to generate the current values Ia, Ib, and Ic.

The temperature estimation unit 344 receives input of the above-mentioned actual current value and estimates a temperature of each of the a-phase, the b-phase, and the c-phase. The temperature is estimated by using also an applied voltage value when the actual current value is measured, and the temperature satisfying a relationship between the voltage and the current is acquired. In other words, the temperature estimation unit 344 estimates the temperature of each phase from a detected current value (actual current value) in each phase of the motor 200. The temperature estimated by the temperature estimation unit 344 may be a temperature of the motor 200 or a temperature of each of the inverters 110 and 120.

The imbalance-compensation-amount calculation unit 345 acquires an imbalance caused between the three phases of the motor 200 based on the temperature estimated by the temperature estimation unit 344. That is, the imbalance-compensation-amount calculation unit 345 calculates an imbalance of current loss based on the temperature estimated by the temperature estimation unit 344. Then, the imbalance-compensation-amount calculation unit 345 calculates a current value that causes heat generation required for compensating the imbalance in each phase as the amount of compensation. Estimating the temperature in each phase of the motor 200 facilitates not only calculation of the imbalance of current loss, but also calculation of the amount of compensation for appropriately suppressing the imbalance.

Regardless of whether the temperature estimation unit 344 estimates the temperature of the motor 200 or the temperature of each of the inverters 110 and 120, the imbalance calculated by the imbalance-compensation-amount calculation unit 345 is an electrical imbalance caused between the three phases of the motor 200. In other words, the imbalance-compensation-amount calculation unit 345 calculates the electrical imbalance between the phases in the motor 200. In particular, in the present embodiment, the imbalance-compensation-amount calculation unit 345 calculates the imbalance of current loss. A well-known technique can be applied as a specific calculation method, so that detailed description thereof will be eliminated here.

An imbalance of current loss (i.e., an imbalance of impedance) causes an imbalance of generated torque, and thus may cause torque ripple. The imbalance of current loss also causes an imbalance of temperature, and the imbalance of temperature causes an additional imbalance of current loss. The imbalance of temperature is not eliminated even when the current values of the respective phases are balanced. Thus, the imbalance-compensation-amount calculation unit 345 calculates the current value of each phase that generates heat to cancel the imbalance of temperature as the amount of compensation. As described below, the amount of compensation of a current in an axial direction other than the q-axis is calculated as the amount of compensation for maintaining the target torque.

Expression (1) below gives a transformation matrix C from the three phases (abc phases) in the motor 200 to qdz axes of the rotating coordinate system.

[Expression 1]

$$[C] = \sqrt{\frac{2}{3}} \begin{bmatrix} \cos\theta & \cos\left(\theta - \frac{2\pi}{3}\right) & \cos\left(\theta - \frac{4\pi}{3}\right) \\ -\sin\theta & -\sin\left(\theta - \frac{2\pi}{3}\right) & -\sin\left(\theta - \frac{4\pi}{3}\right) \\ \frac{1}{\sqrt{2}} & \frac{1}{\sqrt{2}} & \frac{1}{\sqrt{2}} \end{bmatrix} \quad (1)$$

Thus, when the current values Ia, Ib, and Ic flow through the coils of the corresponding phases (a-phase, b-phase, and c-phase) of the motor 200, the current values Iq, Id, and Iz in corresponding qdz axes directions of the rotating coordinate system of the motor 200 are acquired by the following Expression 2.

[Expression 2]

$$\begin{bmatrix} Id \\ Iq \\ Iz \end{bmatrix} = \begin{bmatrix} \frac{\sqrt{2}\cos\theta}{\sqrt{3}} & \frac{\sqrt{2}\cos\left(\theta - \frac{2\pi}{3}\right)}{\sqrt{3}} & \frac{\sqrt{2}\cos\left(\theta - \frac{4\pi}{3}\right)}{\sqrt{3}} \\ -\frac{\sqrt{2}\sin\theta}{\sqrt{3}} & \frac{\sqrt{2}\sin\left(\theta - \frac{2\pi}{3}\right)}{\sqrt{3}} & \frac{\sqrt{2}\sin\left(\theta - \frac{4\pi}{3}\right)}{\sqrt{3}} \\ \frac{1}{\sqrt{3}} & \frac{1}{\sqrt{3}} & \frac{1}{\sqrt{3}} \end{bmatrix} \begin{bmatrix} Ia \\ Ib \\ Ic \end{bmatrix} \quad (2)$$

As described above, the SPM motor is used as the motor 200 in the present embodiment, and thus the torque generated by the motor 200 uniquely corresponds to the current value Iq in the q-axis. Thus, when the current value Iq is constant, the torque generated by the motor 200 is also constant. From Expression (2) above, a correspondence between the current value Iq in the q-axis, and the current values Ia, Ib, and Ic of the respective a-phase, b-phase, and c-phase, can be acquired as in Expression (3) below.

[Expression 3]

$$I_q = -\sqrt{\frac{2}{3}}\left(I_a \cdot \sin(\theta) + I_b \cdot \sin\left(\theta - \frac{2\pi}{3}\right) + I_c \cdot \sin\left(\theta - \frac{4\pi}{3}\right)\right) \quad (3)$$

When a variation of the current value Iq in the q-axis is indicated as ΔIq and variations of the current values Ia, Ib, and Ic of the a-phase, the b-phase, and the c-phase are indicated as ΔIa, ΔIb, and ΔIc, respectively, Expression (4) below is obtained.

[Expression 4]

$$I_q + \Delta I_q = -\sqrt{\frac{2}{3}}\Big((I_a + \Delta I_a) \cdot \sin(\theta) + \\ (I_b + \Delta I_b) \cdot \sin\left(\theta - \frac{2\pi}{3}\right) + (I_c + \Delta I_c) \cdot \sin\left(\theta - \frac{4\pi}{3}\right)\Big) \quad (4)$$

Here, for example, when the b-phase and the c-phase each have a temperature higher than the a-phase, currents corresponding to the variations ΔIb and ΔIc in the respective b-phase and c-phase are reduced. Then, the a-phase in which the current value Iq is constant (i.e., ΔIq is 0) has the variation ΔIa with respect to the variations ΔIb and ΔIc in the respective b-phase and c-phase as described above, the variation ΔIa satisfying a relationship of Expression (5) below.

[Expression 5]

$$\Delta Ia = \left(\Delta I_b \cdot \sin\left(\theta - \frac{2\pi}{3}\right) + \Delta I_c \cdot \sin\left(\theta - \frac{4\pi}{3}\right)\right) \Big/ \sin(\theta) \quad (5)$$

When ΔIa, −ΔIb, and −ΔIc as described above are each used as the amount of compensation, for example, heat generation in the a-phase is promoted, and heat generation in the b-phase and the c-phase is suppressed. Then, when ΔIa, −ΔIb, and −ΔIc as describes above are each used as the amount of compensation, the target torque is maintained. As a result, the imbalance of temperature between the phases of the motor 200 is suppressed, and the imbalance of current loss is also suppressed. The amount of compensation of each of ΔIa, −ΔIb, and −ΔIc is converted into a component in the corresponding one of the qdz axes directions according to Expression (6) below using the transformation matrix C of Expression (1) above.

[Expression 6]

$$\begin{bmatrix} \Delta I_d \\ \Delta I_q \\ \Delta I_z \end{bmatrix} = C \cdot \begin{bmatrix} \Delta I_a \\ -\Delta I_b \\ -\Delta I_c \end{bmatrix} \quad (6)$$

From this Expression (6), the amount of compensation of each of ΔId and ΔIz in the corresponding one of the dz axes directions is given by Expression (7) below.

[Expression 7]

$$\Delta I_d = \sqrt{\frac{2}{3}} \left\{ \Delta I_b \left(\frac{1}{\tan\theta} \cdot \sin\left(\theta - \frac{2\pi}{3}\right) - \cos\left(\theta - \frac{2\pi}{3}\right)\right) + \Delta I_c \left(\frac{1}{\tan\theta} \cdot \sin\left(\theta - \frac{4\pi}{3}\right) - \cos\left(\theta - \frac{4\pi}{3}\right)\right) \right\}$$

$$\Delta I_a = \sqrt{\frac{1}{3}} \left\{ \Delta I_b \left(\frac{1}{\sin\theta} \cdot \sin\left(\theta - \frac{2\pi}{3}\right) - 1\right) + \Delta I_c \left(\frac{1}{\sin\theta} \cdot \sin\left(\theta - \frac{4\pi}{3}\right) - 1\right) \right\} \quad (7)$$

The imbalance-compensation-amount calculation unit 345 calculates the amount of compensation of each of ΔId and ΔIz using Expression (7) above. That is, the imbalance-compensation-amount calculation unit 345 calculates a current compensation value ΔId in the d-axis direction and a current compensation value ΔIz in the z-axis direction using Expression (7) above when an imbalance is caused between the b-phase and the c-phase that are any two phases of the respective phases in the motor 200, and the a-phase that is another one phase therein. Using Expression (7) facilitates calculation of the amount of compensation of each of ΔId and ΔIz.

Then, the target-current correction unit 342 adds the amount of compensation of each of ΔId and ΔIz to the target currents Id, Iq, and Iz. That is, the target-current correction unit 342 reduces an imbalance of the motor 200 by adding a compensation value to a current control value in an axial direction other than the q-axis of current control values calculated by the target-current calculation unit 341.

In the present embodiment, as described above, the motor 200 is an unconnected motor, and the target-current correction unit 342 adds a compensation value for each of the d-axis and the z-axis. Using the compensation value for the z-axis as described above allows a so-called zero-phase current to be effectively used. As described above, the motor 200 in the present embodiment is the SPM motor, so that reluctance torque is not generated in the motor 200. Thus, both the d-axis and the z-axis are effectively used as correction for imbalance.

Expression (7) above cannot be used as it is because the amount of compensation of each of ΔId and ΔIz has a very large value near θ of 0. Thus, the amount of compensation effective near θ of 0 will be examined. Expression (8) below represents a condition allowing the amount of compensation to remain at a finite value even when θ is 0.

[Expression 8]

$$\lim_{\theta \to 0 (mod \pi)} \frac{\Delta I_b - \Delta I_c}{\sin\theta} < \infty \quad (8)$$

Figure 4:
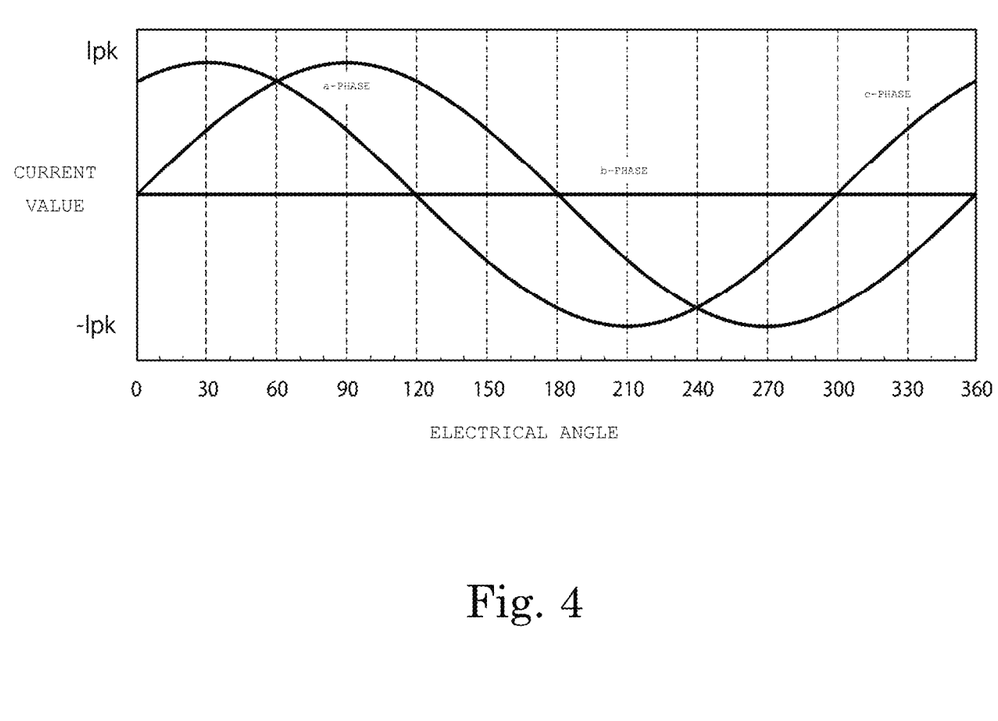
FIG. 4 is a diagram illustrating a current value flowing through each coil of corresponding one of the phases of the motor under drive control of two-phase drive.

As an example of each of ΔIb and ΔIc satisfying Expression (8) above, "ΔIb equal to ΔIc" can be considered. In this case, ΔId of 0 is obtained from Expression (7) above, and the amount of compensation is only ΔIz. When a condition where ΔIb is −Ib is added, the current value Ib in the b-phase after correction becomes 0. Then, two-phase drive is performed in which a current is applied only to the a-phase and the c-phase. FIG. 4 is a diagram illustrating a current value flowing through each coil of corresponding one of phases of the motor 200 under drive control of two-phase drive.

FIG. 4 exemplifies a current waveform (sine wave) acquired by plotting current values flowing through each of the a-phase, b-phase, and c-phase coils of the motor 200 when the first inverter 110 and the second inverter 120 are controlled according to two-phase drive control. FIG. 4 has a horizontal axis representing a motor electrical angle (deg), and a vertical axis representing a current value (A).

As described above, the b-phase has a current value of "0". Although the a-phase and the c-phase have current waveforms different from each other in phase by 120° as illustrated in FIG. 2 under the basic control before correction using the amount of compensation, the a-phase and the c-phase have current waveforms different from each other in phase by 60° after the correction using the amount of compensation. Next, as another example of each of ΔIb and ΔIc satisfying Expression (8) above, ΔIb and ΔIc represented by Expression (9) below can be considered.

[Expression 9]

$$\Delta I_b = -\tfrac{1}{2} \sin^2(\theta) \cdot I_b, \Delta I_c = -\tfrac{1}{2} \sin^2(\theta) \cdot I_c \quad (9)$$

Then, ΔIa corresponding to ΔIb and ΔIc represented by this Expression (9) is represented by Expression (10) below obtained by using the various expressions described above.

[Expression 10]

$$\Delta I_a = \frac{(\sqrt{2}\,I_q\sin(\theta)^3 + \sqrt{2}\,\sqrt{3}\,I_q\cos(\theta)\sin(\theta)^2)\sin\left(\theta - \frac{2\pi}{3}\right)}{4\sqrt{3}\,\sin(\theta)} + \frac{(\sqrt{2}\,I_q\sin(\theta)^3 - \sqrt{2}\,\sqrt{3}\,I_q\cos(\theta)\sin(\theta)^2)\sin\left(\theta - \frac{4\pi}{3}\right)}{4\sqrt{3}\,\sin(\theta)} \quad (10)$$

Using the amount of compensation of each of ΔIa, ΔIb, and ΔIc enables suppressing imbalance even near θ of 0 while satisfying a condition where ΔIq is 0.

Figure 5:
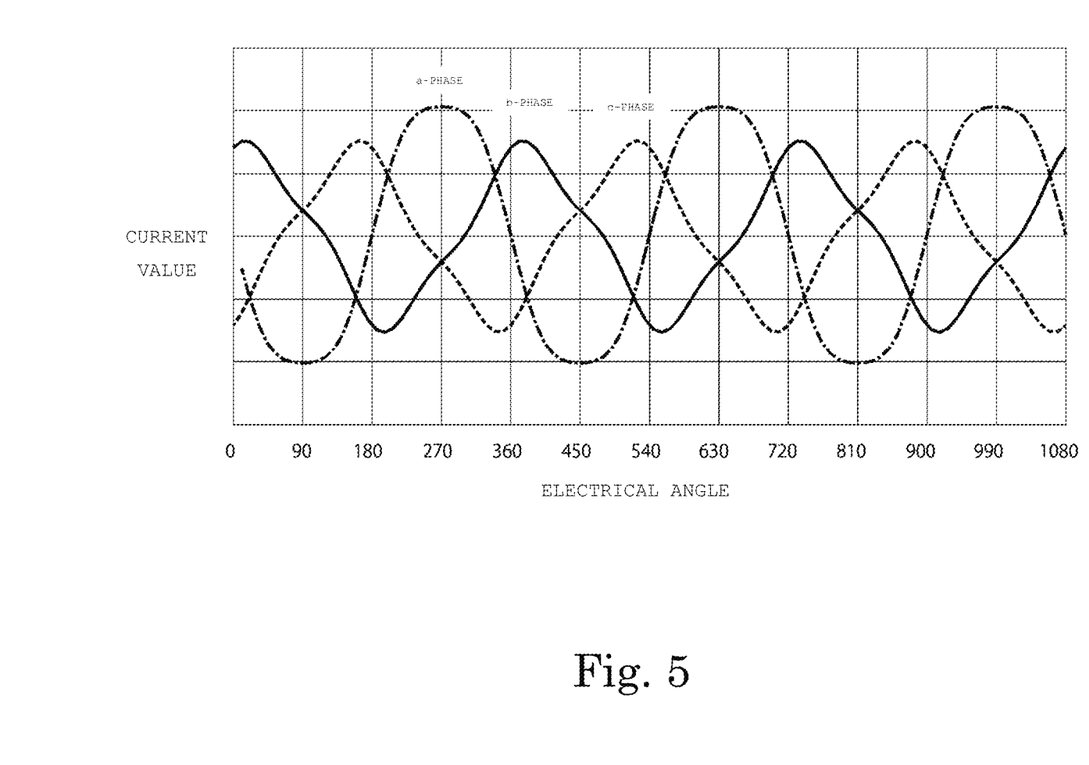
FIG. 5 is a diagram illustrating a current value flowing through each coil of corresponding one of the phases of the motor under drive control with the amount of compensation satisfying Expressions (9) and (10)

FIG. 5 is a diagram illustrating a current value flowing through each coil of corresponding one of phases of the motor 200 under drive control with the amount of compensation satisfying Expressions (9) and (10). FIG. 5 has a horizontal axis representing a motor electrical angle (deg), and a vertical axis representing a current value (A). FIG. 5 illustrates current waveforms in complicated shapes when the amount of compensation satisfying Expressions (9) and (10) is used, and the b-phase and the c-phase each have a contrastive waveform.

Although compensation with the waveforms illustrated in FIGS. 4 and 5 also enables suppressing imbalance while satisfying the condition where ΔIq is 0, the condition of Expression (8) above is applied to cause each phase to have a current value with a low degree of freedom. Thus, the compensation with the waveforms illustrated in FIGS. 4 and 5 is used only near θ of 0, and the amount of compensation calculated by Expression (7) above is used for the other electric angles θ.

Although in the above description, a current value generating a calorific value allowing an imbalance of temperature to be suppressed is calculated as the compensation value, a current value allowing an imbalance of torque generated by the motor 200, the imbalance being caused between the phases, to be suppressed may be calculated as the compensation value.

Vehicles such as automobiles are each generally equipped with a power steering. The power steering generates auxiliary torque for assisting steering torque of a steering system generated by a driver operating a steering handle. The auxiliary torque is generated by an auxiliary torque mechanism, and enables reducing a burden on a driver for operation. For example, the auxiliary torque mechanism includes a steering torque sensor, an ECU, a motor, a speed reduction mechanism, and the like. The steering torque sensor detects steering torque in the steering system. The ECU generates a drive signal based on a detection signal of the steering torque sensor. The motor generates an auxiliary torque suitable for steering torque based on the drive signal, and transfers the auxiliary torque to the steering system using the speed reduction mechanism.

Figure 6:
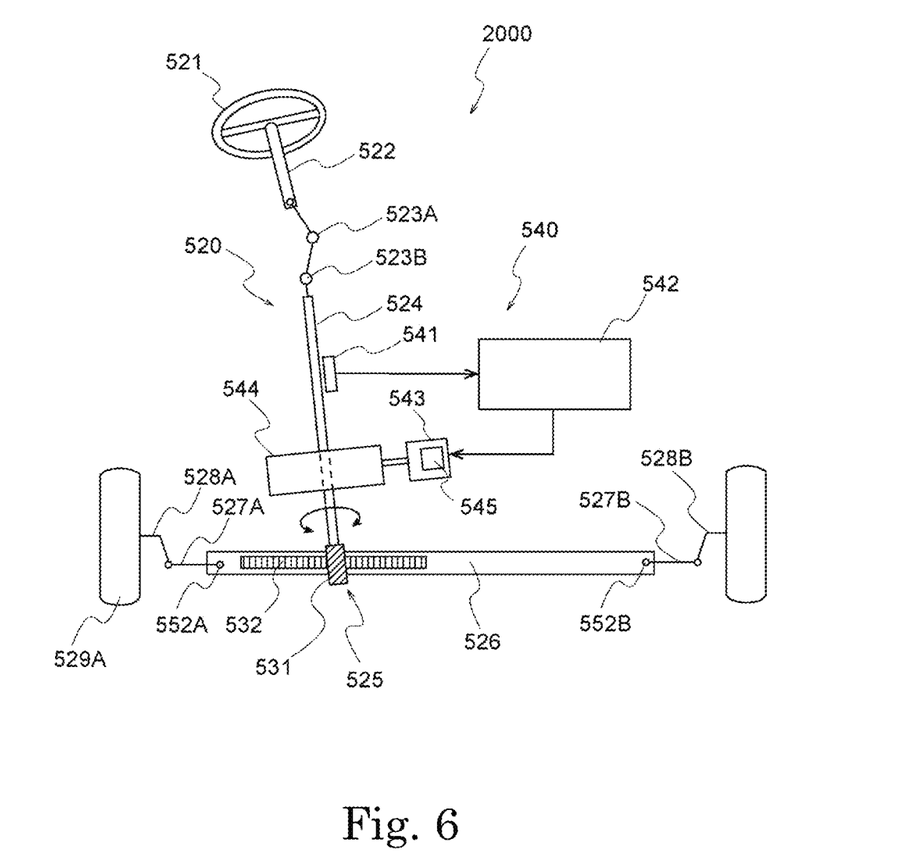
FIG. 6 is a diagram schematically illustrating a structure of a power steering according to the present embodiment.

The motor drive unit 1000 of the above embodiment is suitably used for a power steering. FIG. 6 is a diagram schematically illustrating a structure of the power steering 2000 according to the present embodiment. The electric power steering 2000 includes a steering system 520 and an auxiliary torque mechanism 540.

The steering system 520 includes, for example, a steering handle 521, a steering shaft 522 (also referred to as a "steering column"), universal couplings 523A and 523B, and a rotating shaft 524 (also referred to as a "pinion shaft" or "input shaft").

The steering system 520 includes, for example, a rack and pinion mechanism 525, a rack shaft 526, left and right ball joints 552A and 552B, tie rods 527A and 527B, knuckles 528A and 528B, and left and right steering wheels (e.g., left and right front wheels) 529A and 529B.

The steering handle 521 is connected to the rotating shaft 524 using the steering shaft 522 and the universal couplings 523A and 523B. The rotating shaft 524 is connected to the rack shaft 526 using the rack and pinion mechanism 525. The rack and pinion mechanism 525 includes a pinion 531 provided on the rotating shaft 524 and a rack 532 provided on the rack shaft 526. The rack shaft 526 is connected at its right end to the right steering wheel 529A using a ball joint 552A, a tie rod 527A, and a knuckle 528A, which are provided in this order. As on the right side, the rack shaft 526 is connected at its left end to the left steering wheel 529B using a ball joint 552B, a tie rod 527B, and a knuckle 528B, which are provided in this order. Here, the right side and the left side respectively correspond to a right side and a left side as seen from a driver sitting in a seat.

The steering system 520 is configured such that steering torque is generated when the driver operates the steering handle 521, and is transferred to the left and right steering wheels 529A and 529B using the rack and pinion mechanism 525. This enables the driver to operate the left and right steering wheels 529A and 529B.

The auxiliary torque mechanism 540 includes, for example, the steering torque sensor 541, the ECU 542, the motor 543, the speed reduction mechanism 544, and an electric power supply device 545. The auxiliary torque mechanism 540 applies auxiliary torque to the steering system 520 from the steering handle 521 to the left and right steering wheels 529A and 529B. The auxiliary torque may be referred to as "additional torque".

As the ECU 542, for example, the control circuit 300 illustrated in FIG. 1 is used. As the electric power supply device 545, for example, the electric power supply device 100 illustrated in FIG. 1 is used. As the motor 543, for example, the motor 200 illustrated in FIG. 1 is used. The ECU 542, the motor 543, and the electric power supply device 545 may constitute a unit generally referred to as a "mechanical and electrical integrated motor". Elements illustrated in FIG. 6 include elements excluding the ECU 542, the motor 543, and the electric power supply device 545, and constituting a mechanism that corresponds to an example of a power steering mechanism driven by the motor 543.

The steering torque sensor 541 detects steering torque of the steering system 520, applied using the steering handle 521. The ECU 542 generates a drive signal for driving the motor 543 based on a detection signal from the steering torque sensor 541 (hereinafter, referred to as a "torque signal"). The motor 543 generates auxiliary torque suitable for the steering torque based on the drive signal. The auxiliary torque is transferred to the rotating shaft 524 of the steering system 520 using the speed reduction mechanism 544. The speed reduction mechanism 544 is, for example, a worm gear mechanism. The auxiliary torque is further transferred from the rotating shaft 524 to the rack and pinion mechanism 525.

The power steering 2000 is classified into a pinion assist type, a rack assist type, a column assist type, or the like, depending on a place in the steering system 520, to which auxiliary torque is applied. FIG. 6 illustrates the power steering 2000 of the pinion assist type. The power steering 2000 is also applied to the rack assist type, the column assist type, and the like.

The ECU 542 can receive not only a torque signal, but also a vehicle speed signal, for example. The microcontroller of the ECU 542 can control the motor 543 based on the torque signal, the vehicle speed signal, and the like.

The ECU 542 sets a target current value based on at least the torque signal. The ECU 542 preferably sets the target current value in consideration of not only a signal of vehicle speed detected by the vehicle speed sensor but also a signal of rotation of the rotor detected by the angle sensor. The ECU 542 can control the drive signal of the motor 543, i.e., the drive current thereof so that the actual current value detected by the current sensor (refer to FIG. 1) coincides with the target current value.

The power steering 2000 enables the left and right steering wheels 529A and 529B to be operated by the rack shaft 526 using combined torque obtained by adding auxiliary torque of the motor 543 to steering torque of the driver. In particular, when the motor drive unit 1000 of the above-described embodiment is used for the above-mentioned mechanical and electrical integrated motor, generation of torque ripple is suppressed even during low-speed steering to achieve smooth power assist.

Although in the above description, the present invention is applied for the purpose of reducing an imbalance state in a power steering or the like, the present invention may be applied for other purposes. For example, the present invention may be applied to a traction device in which a motor is intentionally caused to generate heat for heating of an in-vehicle air conditioner. More specifically, a current of each of abc phases is superimposed on a zero-phase current that does not contribute to torque. Increase in the amount of current in this way enables the motor to generate heat. Then, the heat generated by the motor is used for heating of the in-vehicle air conditioner. This enables an in-vehicle air conditioning system used for a conventional engine to be used even when the engine is replaced with a motor for automatic driving or the like.

A drive controller according to an aspect of the present invention applied to such another object controls drive of a three-phase motor, and includes a control value calculation unit that calculates current control values in respective axial directions of a rotating coordinate system of the three-phase motor according to a given target, and a correction unit that adds a current of each of abc phases in the three-phase motor to a zero-phase current or a d-axis current for the current control values calculated by the control value calculation unit.

Although the power steering is described here as an example of application of the drive controller and the drive unit of the present invention, the application of the drive controller and the drive unit of the present invention is not limited to the above, and the drive controller and the drive unit can be used in a wide range including a pump and a compressor.

It is to be considered that the embodiments and modifications described above are illustrative in all aspects, and are not restrictive. The scope of the present invention is shown in the scope of claims instead of the above embodiments, and is intended to include meaning equivalent to the scope of claims and all modifications in the scope of claims.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A drive controller for controlling drive of a three-phase motor, the drive controller comprising:
    an imbalance calculation unit that calculates an electrical imbalance between phases in the three-phase motor;
    a control value calculation unit that calculates current control values in respective axial directions of a rotating coordinate system of the three-phase motor according to a given target;
    a balance compensation unit that reduces the electrical imbalance by adding a compensation value to a current control value in an axial direction other than a q-axis of the current control values calculated by the control value calculation unit; and
    a temperature estimation unit that estimates temperature of each of the phases from a detected current value in each of the phases of the three-phase motor,
    wherein the imbalance calculation unit calculates an imbalance of current loss based on the temperature estimated by the temperature estimation unit.

2. The drive controller according to claim 1, wherein
the three-phase motor is an unconnected motor, and
the balance compensation unit adds compensation values for both a d-axis and a z-axis.

3. The drive controller according to claim 2, wherein
the three-phase motor is an SPM motor in which a magnet is provided on a surface of a rotor.

4. The drive controller according to claim 1, wherein
the balance compensation unit calculates a current compensation value $\Delta Id$ in a d-axis direction and a current compensation value $\Delta Iz$ in a z-axis direction using Expression 1 below when an imbalance is caused between a b-phase and a c-phase that are any two phases of the respective phases in the three-phase motor, and an a-phase that is another one phase in the three-phase motor, $$\Delta I_d = \sqrt{\frac{2}{3}} \left\{ \Delta I_b \left( \frac{1}{\tan\theta} \cdot \sin\left(\theta - \frac{2\pi}{3}\right) - \cos\left(\theta - \frac{2\pi}{3}\right) \right) + \Delta I_c \left( \frac{1}{\tan\theta} \cdot \sin\left(\theta - \frac{4\pi}{3}\right) - \cos\left(\theta - \frac{4\pi}{3}\right) \right) \right\}$$

$$\Delta I_a = \sqrt{\frac{1}{3}} \left\{ \Delta I_b \left( \frac{1}{\sin\theta} \cdot \sin\left(\theta - \frac{2\pi}{3}\right) - 1 \right) + \Delta I_c \left( \frac{1}{\sin\theta} \cdot \sin\left(\theta - \frac{4\pi}{3}\right) - 1 \right) \right\}.$$

[Expression 1]

5. A drive unit comprising:
    the drive controller according to claim 1; and
    the three-phase motor that is driven under control of the drive controller.

6. A power steering comprising:
    the drive controller according to claim 1;
    the three-phase motor that is driven under control of the drive controller; and
    a power steering mechanism that is driven by the three-phase motor.

7. A drive controller for controlling drive of a three-phase motor, the drive controller comprising:
    an imbalance calculation unit that calculates an electrical imbalance between phases in the three-phase motor;

a control value calculation unit that calculates current control values in respective axial directions of a rotating coordinate system of the three-phase motor according to a given target; and a balance compensation unit that reduces the electrical imbalance by adding a compensation value to a current control value in an axial direction other than a q-axis of the current control values calculated by the control value calculation unit, wherein the balance compensation unit calculates a current compensation value $\Delta Id$ in a d-axis direction and a current compensation value $\Delta Iz$ in a z-axis direction using Expression 1 below when an imbalance is caused between a b-phase and a c-phase that are any two phases of the respective phases in the three-phase motor, and an a-phase that is another one phase in the three-phase motor,

[Expression 1]

$$\Delta I_d = \sqrt{\frac{2}{3}} \left\{ \Delta I_b \left( \frac{1}{\tan\theta} \cdot \sin\left(\theta - \frac{2\pi}{3}\right) - \cos\left(\frac{2\pi}{3}\right) \right) + \Delta I_c \left( \frac{1}{\tan\theta} \cdot \sin\left(\theta - \frac{4\pi}{3}\right) - \cos\left(\frac{3\pi}{3}\right) \right) \right\}$$

-continued $$\Delta I_z = \sqrt{\frac{1}{3}} \left\{ \Delta I_b \left( \frac{1}{\sin\theta} \cdot \sin\left(\theta - \frac{2\pi}{3}\right) - 1 \right) + \Delta I_c \left( \frac{1}{\sin\theta} \cdot \sin\left(\theta - \frac{4\pi}{3}\right) - 1 \right) \right\}$$

8. The drive controller according to claim 7, wherein the three-phase motor is an unconnected motor, and the balance compensation unit adds compensation values for both a d-axis and a z-axis.

9. The drive controller according to claim 8, wherein the three-phase motor is an SPM motor in which a magnet is provided on a surface of a rotor.

10. A drive unit, comprising:

the drive controller according to claim 7; and the three-phase motor that is driven under control of the drive controller.

11. A power steering, comprising:

the drive controller according to claim 7;

the three-phase motor that is driven under control of the drive controller; and a power steering mechanism that is driven by the three-phase motor.

* * * * *